May 13, 1947.  E. R. BEHN  2,420,408
NON-OPTICAL RADIOSCOPE RANGEFINDER
Filed Sept. 29, 1941  3 Sheets-Sheet 1

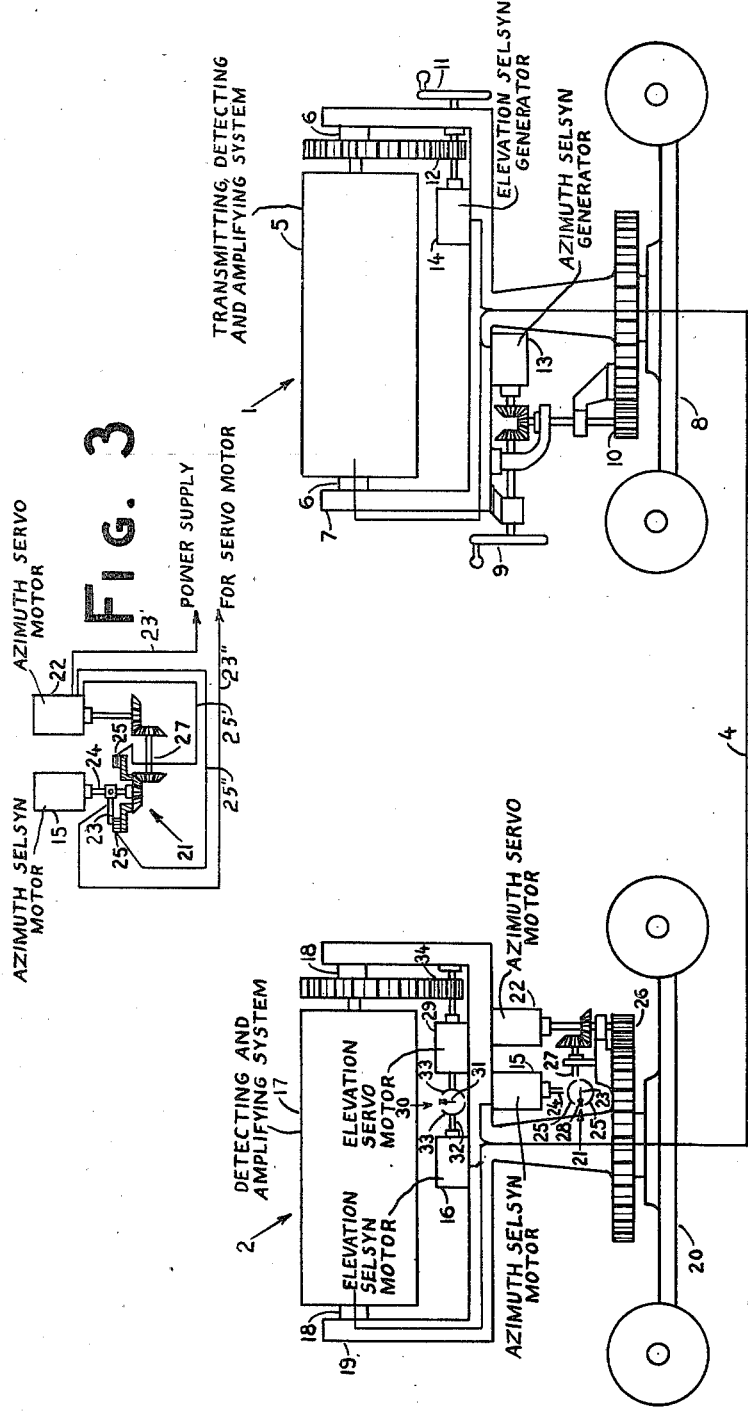

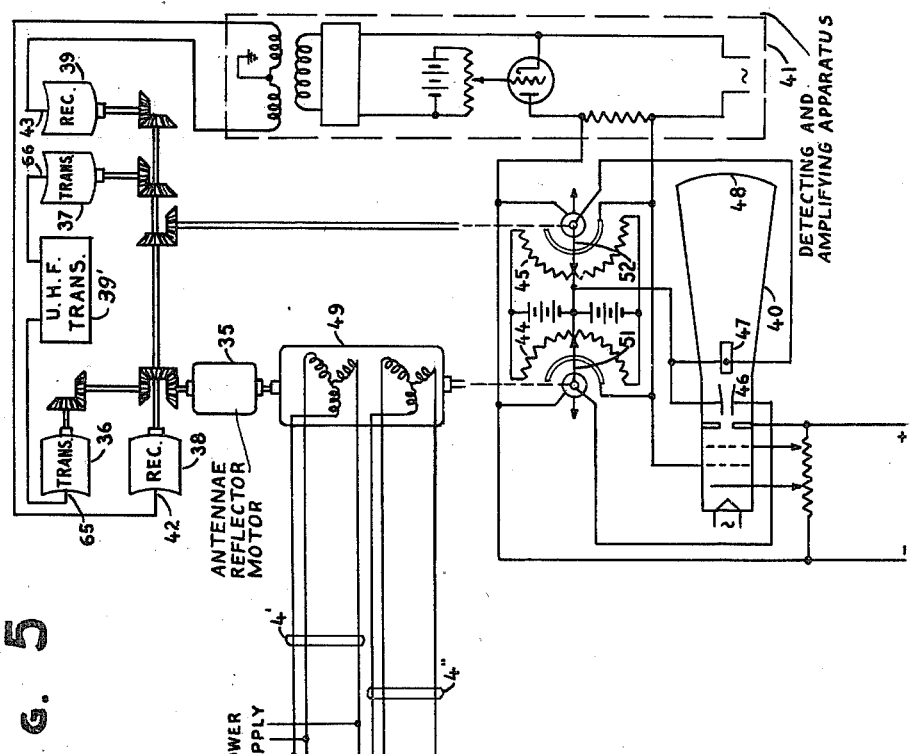
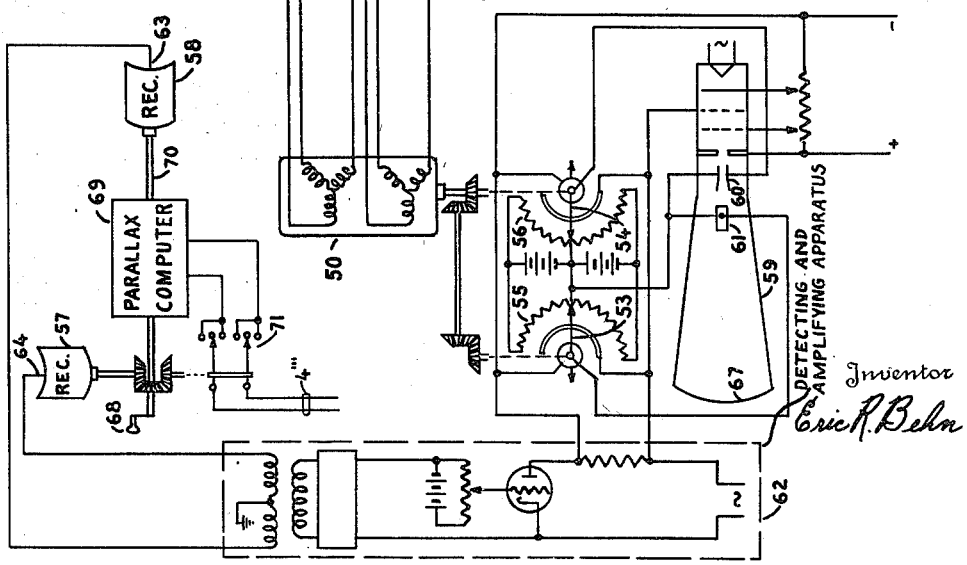
Fig. 5

Patented May 13, 1947

2,420,408

UNITED STATES PATENT OFFICE 2,420,408

NONOPTICAL RADIOSCOPE RANGEFINDER

Eric R. Behn, Arlington County, Va.

Application September 29, 1941, Serial No. 412,883

11 Claims. (Cl. 250—1.70)

This invention relates to a new and useful non-optical device for detecting and locating objects in space and for determining the distance between the subject apparatus and objects in space by means of radian energy. This invention is particularly useful in locating the position in space of aircraft when visibility conditions are poor, for purposes of furnishing useful information to said aircraft when it is landing under adverse conditions, for navigational purposes, or for use in directing gunfire at enemy aircraft or surface targets and for other useful purposes.

With the above stated uses in view, it is necessary that the invention indicate the distance (hereinafter termed "range") between the apparatus and the object to be located and also to indicate its bearing in azimuth and elevation. In determining bearing in azimuth and elevation, reference is made to U. S. Patent No. 2,231,929, "Tridimensional radio direction indicator." The accompanying description indicates a preferred arrangement of the apparatus, however, it should be borne in mind that other means could be used for accomplishing the objects and facilitating the uses of this invention.

An object of this invention is to provide a non-optical radio range-finder that employs ultra-high frequency radiation, directional antennae for transmitting such radiant energy, two radiant energy directional receiving means and associated apparatus which first and second receiving means are separated by a known distance and receiving radiant energy and means for synchronizing and coordinating the movements of directional antennae and apparatus at said points remotely situated from each other such that said antennae may, even though at widely separated points, be instantaneously and simultaneously, aimed at the object to be located. The directions in azimuth and elevation at both portions of the apparatus, when aimed at the object, are introduced into a parallax computer which by use of triangulation principles and computing mechanisms, continuously indicates range, horizontal component of range and vertical component of range (altitude), or any one or more of these quantities or rates of change of these quantities, or other related quantities as said object moves through space.

Another object of this invention is to provide means for selecting the object whose range is to be determined from any number of objects distributed throughout space within the range of the instrument, all of said objects being continuously indicated, both as to their presence and their relative angular location with respect to horizontal and vertical reference planes. Other objects will appear from the hereinafter described invention and the accompanying drawings, in which:

Figure 3 illustrates a part of the apparatus at the receiving end, which automatically responds to the rotation of a "selsyn" motor.

Figure 4 is a view in elevation of the structural arrangement of the transmitting and receiving ends of the apparatus.

Figure 5 is a schematic wiring diagram of the invention.

Figure 6 is a plan view illustrating a typical arrangement of a plurality of receiving means.

Figure 1:
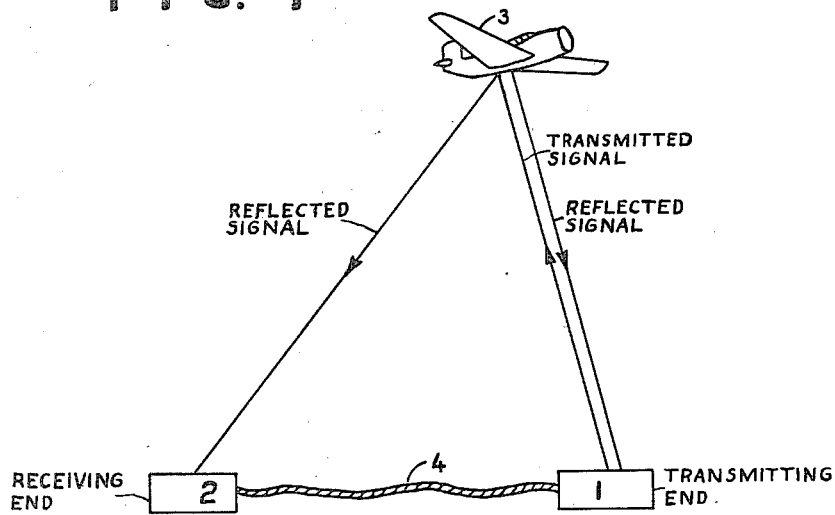
Figure 1 is a view in elevation, illustrating the principle involved in determining the distance and direction to a remote object.

*Referring to Figure 1 of the drawings.*—The essential elements of this rangefinder comprise two distinct parts separated from each other, for example by a distance of 100 feet; one part, hereinafter called "transmitting end" 1 contains equipment for transmitting radiant energy and receiving radiant energy reflected signals from an object in space and the other part, hereinafter called "receiving end" 2 contains equipment for receiving reflected signals from an object in space.

Similar to prior art systems, and as described in U. S. Patent No. 2,231,929, the transmitting end consists essentially of directional antennae and associated apparatus for continuously sending out sharply focused waves and receiving the reflected waves such that continuous indications of the bearing of the selected object 3 in azimuth and elevation within a specified solid angle of space, may be given.

The receiving end consists essentially of directional antennae for receiving signals reflected from an object in space, which radiant energy originates at the transmitting end.

A multiple conductor cable 4 interconnects the transmitting and receiving ends and also a common source of alternating current power is supplied to both ends, the functions of which cable will be completely described hereinafter.

Figure 2:
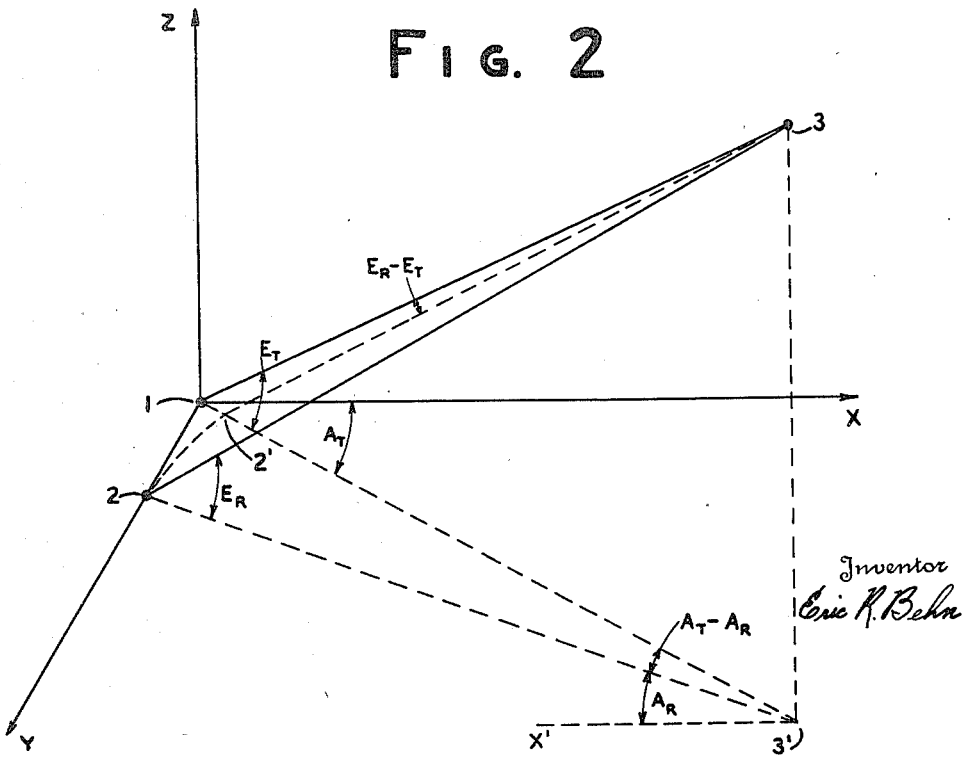
Figure 2 is a 3-dimensional illustration of the geometric problem to be solved in determining the interrelation between distances and angles of azimuth and elevation of an object in space measured from two fixed points, which are separated by a known distance.

*Referring to Figure 2 of the drawings*

X, Y, Z = coordinate axes.

Angle $(313') = E_T$, angle of elevation measured from transmitting end 1.

Angle $(323') = E_R$, angle of elevation measured from receiving end 2.

Angle $(X13') = A_T$, angle of azimuth measured from transmitting end 1.

Angle $(X'3'2) = A_R$, angle of azimuth measured from receiving end 2.

For purposes of the following mathematical analysis, the following additional symbols are defined:

$R_T$ = distance measured from transmitting end 1 to object.

$R_R$ = distance measured from receiving end 2 to object.

H = horizontal distance between 1 and 2.

Consider triangle 1, 2, 3' and apply the trigonometric law of sines:

$$\operatorname{Sin}\,(A_T - A_R) = \frac{H \cos A_R}{R_T \cos E_T} \quad (1)$$

$$\operatorname{Sin}\,(A_T - A_R) = \frac{H \cos A_T}{R_R \cos E_R} \quad (2)$$

Rotate triangle 233' about the side 33' as an axis until it is in plane 133' and occupies the position 2'33'. Consider 2'31 and apply the trigonometric laws of sines:

$$\operatorname{Sin}\,(E_R - E_T) = \frac{(R_T \cos E_T - R_R \cos E_R) \sin E_T}{R_R} \quad (3)$$

$$\operatorname{Sin}\,(E_R - E_T) = \frac{(R_T \cos E_T - R_R \cos E_R) \sin E_R}{R_T} \quad (4)$$

Divide Equations 1 and 2, obtaining:

$$\frac{\cos A_R}{\cos A_T} = \frac{R_T}{R_R} \cdot \frac{\cos E_T}{\cos E_R} \quad (5)$$

Divide equations 3 and 4, obtaining:

$$\frac{R_T}{R_R} = \frac{\sin E_R}{\sin E_T} \quad (6)$$

Combine Equations 5 and 6 obtaining:

$$\frac{\tan E_R}{\tan E_T} = \frac{\cos A_R}{\cos A_T} \quad (7)$$

Equation 7 indicates that there is a mathematical relation between the angles of azimuth and elevation of a point in space measured from two separated points. Equations 1 and 2 indicate that measuring the angles of azimuth and elevation to an object in space from two different points establishes a mathematical relation between range and the angles of elevation and azimuth. By measuring all the angles, and by applying known mechanical computing methods, the range may be calculated by introducing all of these quantities into a calculating machine associated with the apparatus.

*Referring to Figures 3 and 4 of the drawings.—* At the transmitting end 1, all of the equipment for sending and receiving signals is suspended in a cradle 5 from trunnions 6, journaled in a yoke 7 mounted on a carriage 8. A handwheel 9, connects through gearing 10 for turning the yoke 7 in azimuth. In a similar manner a handwheel 11 connects through gearing 12 to rotate the transmitting and receiving equipment in elevation about the trunnions 6. The rotational movement in azimuth and elevation of the transmitting equipment caused by the handwheels, 9 and 11, is transmitted to the receiving end by means of a self-synchronous transmission system, employing "selsyns." Movement of the azimuth handwheel 9 operates "selsyn" generator 13 and movement of the elevation handwheel 11 operates "selsyn" generator 14.

At the receiving end 2, the signals transmitted by "selsyn" generators 13 and 14 are received on "selsyn" motors 15 and 16 respectively over multiple conductor cable 4. The equipment for receiving signals is suspended in a cradle 17 from trunnions 18, journaled in a yoke 19, mounted on a carriage 20. "Selsyn" motor 15 operates a follow-up mechanism 21 which controls the power supplied to a servo or reversing motor 22 so that it rotates the yoke 19 by the same angular displacement as the rotation of "selsyn" motor 15. The follow-up mechanism 21 comprises an oscillating arm 23 carrying a sliding contact which is mounted on a shaft 24 of "selsyn" motor 15. The servo motor 22 is connected to one side of a power supply by means of the lead 23'. The other side of the power supply connects to the oscillating arm 23 by means of the lead 23''. Rotation of the shaft 24 causes the arm 23 to make contact with either one of the two semi-circular slip ring segments 25 thus completing an electrical circuit to the windings of the servomotor 22 through either lead 25' or 25'', causing it to run in one direction or the other. The servomotor is so connected that it drives the yoke 19 through gearing 26 in the proper direction to follow up the change in the value actuating the arm 23. Servomotor 22 through shaft 27 causes the rotation of the two semi-circular slip ring segments 25 in the same direction as the arm 23. Since the motor will be energized so long as the arm 23 makes contact with either slip ring segment 25 it will rotate until its angular displacement is the same as that of "selsyn" motor 15 at which time arm 23 will be on the insulated island 28 between both slip ring segments. It is evident that the load that can be driven by the servomotor 22 will depend on its power and will be independent of the power available in "selsyn" motor 15 since the "selsyn" motor acts only to close the circuit supplying power to the servomotor.

The rotation of the receiving equipment in elevation on trunnions 18 by means of servomotor 29 cooperating with "selsyn" motor 16 and the follow-up mechanism 30, is similar to the rotation of the yoke 19, in azimuth. The oscillating arm 31 mounted on shaft 32 of "selsyn" motor 16 makes contact with either of the two semi-circular slip ring segments 33 thus completing an electrical circuit to the servomotor until its response is identical with the angular displacement of "selsyn" motor 16 causing rotation of the receiving equipment in elevation through gearing 34.

Thus any movements of the transmitting and receiving equipment at the transmitting end in azimuth and elevation by means of handwheels 9 and 11 causes similar movements of the receiving equipment at the receiving end.

*Referring to Figure 5 of the drawings.—* Pieces 35, 36, 37, 38, 39, 40, 41, 42, 43, 44, 45, 46, 47, 48, 49, 51, 52, 65 and 66 are located in the cradle 5 shown in Figure 4; pieces 50, 53, 54, 55, 56, 57, 58, 9, 60, 61, 62, 63, 64, 67, 68, 69, 70, 71 are located in cradle 17 shown in Figure 4. At the transmitting end, the motor 35 through gearing causes the transmitting antenna reflectors 36 and 37 for elevation and azimuth to rotate in synchronism with the receiving antenna reflectors 38 and 39 for elevation and azimuth respectively. UHF transmitter 39' at the transmitting end 1, energizes the transmitting antennae 65 and 66 for transmitting elevation and azimuth signals respectively. Transmitting antennae 65 and 66 are associated with directional reflectors 36 and 37 respectively. At the transmitting end 1 are also located receiving antennae 42 and 43 for receiving elevation and azimuth signals respectively from directions determined by the position of the associated directional reflectors 38 and 39, respectively. By means of the electrical circuits shown, the cathode ray tube 40 is normally biased to an inoperative condition and is energized from the radio detector and amplifier 41 only when a signal is simultaneously received by the receiving antennae 42 and 43 in both elevation and azimuth. By means of the potentiometers 44 and 45, voltages which are proportional to the angular displacement of their associated antenna reflectors 38 and 39, are applied to the deflecting plates 46 and 47 of the cathode ray tube causing deflection of the spot appearing on the viewing screen 48 of cathode ray tube 40, from the center in two directions at right angles to each other corresponding to elevation and azimuth. Thus a visual indication of the location of an object is given on the viewing end 48 of the cathode ray tube when both elevation and azimuth antenna reflectors 38 and 39 are instantaneously and simultaneously directed at the object. The rotation of the elevation and azimuth antenna reflectors 38 and 39 by the motor 35 is such that continuous indications of all objects within a desired space angle are given. The amount of space covered may be controlled by varying the angular extent of the potentiometers 44 and 45. The object whose range is to be determined is selected on the viewing screen 48 of the cathode ray tube 40, and the apparatus rotated in azimuth and elevation such that this object is centered on the viewing screen 48. For a more complete description of the above part of Figure 5, see U. S. Patent No. 2,231,929.

At the transmitting and receiving ends, respectively are two identical three phase wound-rotor induction motors 49 and 50. The stator windings are interconnected by conductors 4' of the cable 4 and are excited from a common source while the rotors are also electrically interconnected by conductors 4" of cable 4. The rotor of motor 49 is coupled to, or mounted on the same shaft as the motor 35. By this electrical tie, the shafts driving the rotating arms 51, 52, 53, and 54 of potentiometers 44, 45, 55 and 56 may be held in step during acceleration and running, since any external force to pull motors 49 and 50 apart, is resisted. (See American Institute of Electrical Engineers publications, Electrical Engineering, December 1933, Induction motors as Selsyn drives; L. M. Nowacki.) The receiving end azimuth and elevation antenna reflectors 57 and 58 initially are positioned in space so that when their associated potentiometer arms 53 and 54 are in the neutral or mid-position the antennae will be directed along planes which are parallel to the planes defined by the corresponding transmitting end antennae 36 and 37, or 38 and 39 when their associated potentiometer arms 51 and 52 are in the neutral or mid-position. The potentiometer arms 51, 52, 53 and 54 at the transmitting and receiving ends are kept in synchronism with respect to their angular displacement from their mid-positions by means of motors 49 and 50. Thus the same voltages will be applied to the reflecting places 46 and 47 of the transmitting end cathode ray tube 40 as are applied at the receiving end cathode ray tube 59 to the corresponding deflecting plates 60 and 61, and therefore at any time if both cathode ray tubes 40 and 59 were simultaneously energized, a spot will appear in an identical position on the viewing screen of both tubes. The necessity for this will become apparent hereinafter.

By means of the electrical circuits shown and similar to the electrical system described in Patent No. 2,231,929, the cathode ray tube 59 at the receiving end is normally biased to an inoperative condition and is energized from the radio detector and amplifier 62, only when the azimuth and elevation antennae 63 and 64 receive simultaneous signals.

The line formed by the intersection of the planes defined by the transmitting end antenna reflectors 36 and 37 is hereinafter called the line of sight from the transmitting end. Similarly the line of sight from the receiving end is the line formed by the intersection of the planes defined by the receiving end antenna reflectors 57 and 58. The rotation of the transmitting end in azimuth and elevation by amounts equal to the angles of azimuth and elevation of the selected object measured from the transmitting end, causes the visual indication of the selected object to appear at the center of the viewing end 48 of the transmitting end cathode ray tube 40 and causes similar angular displacements at the receiving end as previously described and illustrated in Figure 4. Then when the transmitting end antennae 65 and 66 are directed at the selected object centered on the viewing screen 48 of cathode ray tube 40, and the displacement in azimuth and elevation of the receiving end antennae is the same as the transmitting end antennae, no signals can be received or indicated on the viewing screen 67 of the receiving end cathode ray tube 59, because when this condition occurs, the line of sight from the receiving end is parallel to the line of sight from the transmitting end. It must be borne in mind that in view of the directional characteristics of the transmitted wave, for the receiving end antennae 63 and 64 to receive any signal whatsoever, they must be simultaneously directed at the same object at which the transmitting end antennae 65 and 66 are directed.

The transmitting end antenna reflectors are continuously rotating and when they are directed at any object other than the one corresponding to the visual indication at the center of the viewing screen 48 of cathode ray tube 40, the visual indication for this object would not be at the center but displaced because of the displacement of the potentiometer arms 51, 52, 53 and 54 from their mid-positions. Therefore should the receiving end antennae also be directed at this object, the visual indication on the viewing screen 67 of the receiving end cathode ray tube 59 would not be at the center but displaced to a position similar to that on the viewing screen 48 of the transmitting end cathode ray tube 40 because with the potentiometer arms 51, 52, 53, and 54 in synchronism, the same voltages are applied to corresponding deflecting plates in both cathode ray tubes 40 and 49. Thus only when the receiving end directional antennae 63 and 64 are directed at the object corresponding to the visual indication at the center of the viewing screen 48 of the transmitting end cathode ray tube can a spot appear at the center of the viewing screen 63 of the receiving end cathode ray tube since this is the only time that all of the potentiometer arms 51, 52, 53 and 54 are in their mid-position. Furthermore when a spot does appear at the center of the viewing screen of both cathode ray tubes, the receiving and transmitting end antennae must be directed at the selected object.

Unless the relative positions of receiving and transmitting end antennae are changed from their initial relative positions, the receiving end antennae would not be directed at the selected object. By means of the handwheel 68, the receiving end antenna reflectors 57 and 58 may be angularly displaced from the respective transmitting end antenna reflectors 38 and 39 so that corresponding antennae reflectors at transmitting and receiving ends are no longer parallel when the transmitting end antennae are directed at the object centered on the viewing screen of the transmitting end cathode ray tube 40. Thereby the relative angular displacement of the receiving and transmitting end antenna reflectors may be controlled. Parallax computing machine 69 solves Equation 7 for $E_R$ when the quantities $E_T$, $A_T$ and $A_T - A_R$ are introduced and its output into shaft 70 is $E_T - E_R$. Quantities $E_T$ and $A_T$ are conveniently introduced electrically into computing machine 69 by means of the "Selsyn" transmission units 13 and 14 located at transmitting end 1; quantity $A_T - A_R$ is introduced by rotation of handwheel 68 which quantity when combined with $A_T$ will give $A_R$, and then all the necessary quantities for the solution of Equation 7 will have been introduced. The solution of Equation 7 for $E_R$ when combined with $E_T$ to give $E_R - E_T$, is the output of computing machine 69. This is a continuous output so long as all of the three quantities necessary for the solution of Equation 7 are introduced. To prevent antenna reflectors 57 and 58 from swinging around while selecting an object at the transmitting end, switch 71 is placed in the conductors 4''' of cable 4, transmitting $A_T$ and $E_T$ to the computing machine 69. Switch 71 is a double pole, three position switch which disconnects the circuits when handwheel 68 is in its initial zero position but connects the circuits when handwheel 68 is rotated either clockwise or counterclockwise. Thus for any input to the computing machine by means of handwheel 68, the transmitting and receiving end reflectors take relative positions such that the line of sight from the receiving end intersects the line from the transmitting end to the selected object. Thus referring again to Figure 2, the movement of the receiving end antennae is delimited such that plane 123 is its only field of reception of reflected energy, and the line of sight from the receiving end is made to scan the line from the transmitting end to the selected object. When it is desired to direct the receiving end at the object selected from the transmitting end, the operator at the receiving end turns handwheel 68 in such direction as to cause the lines of sight from the transmitting and receiving ends to converge until a spot appears at the center of the viewing screen 67 of the receiving end cathode ray tube 59.

Without the follow up mechanism 21 and 30 associated with "selsyn" 15 and 16, to rotate the receiving end in accordance with handwheels 9 and 11, the operator at the receiving end would not know the relative position of the selected object in azimuth, and would lose valuable time in trying to locate the selected object by movement of handwheel 64. In addition, because movement of handwheels 9 and 11 at the transmitting end, causes the line of sight from the receiving end to remain parallel to the line from the transmitting end to the selected object, the movement of handwheel 68 to cause the line of sight from the receiving end to converge at the selected object with the line from transmitting end to the selected object, will be very small. By means of computing machine 69, Equation 1 may also be solved for range since all the quantities necessary for the solution of this equation have been introduced by positioning the receiving and transmitting ends so that the lines of sight from both ends are instantaneously and simultaneously directed at the selected object.

*Referring to Figure 6 of the drawings.*—The scope of this invention includes the use of more than one receiving end with a transmitting station and is not limited to only one receiving station situated remotely from the transmitting station. The use of more than one receiving station, for example two receiving stations 2' and 2'' located at two vertices of an equilateral triangle with the transmitting station 1' at the other vertex would allow using either receiving station within angles which would obtain the greatest accuracy of measurement. It will be noted that the greatest accuracy is obtained by using the transmitting and receiving stations such that the angle between the line of sight from the object to the transmitting station 1' and the line of sight from the object to one of the receiving stations is larger than if the other receiving station were used. Thus in Figure 6, the positions of objects in zones 1 and 3 would in general be best determined by using receiving station 2' with the transmitting station 1'. Similarly, the positions of objects in zones 2 and 4 would in general be best determined by using receiving station 2'' with the transmitting station 1'.

While a specific embodiment of this invention has been developed, many changes could be made in the above construction and many apparently different embodiments of this invention could be made without departing from the scope thereof, and it is intended that all matter contained in the above description shall be interpreted as illustrative and not a limiting sense.

What is claimed is:

1. In apparatus for selecting and locating an object in space, first and second directional radiant energy receiving means separated by a predetermined distance, said first receiving means being connected to means synchronized therewith to continually designate the line of sight of a selected object from said first receiving means and means to direct said second receiving means at the same selected object, said directing means including means to cause said second receiving means to scan along said line of sight of the selected object from the first receiving means.

2. In apparatus as recited in claim 1 and in which means are provided to indicate when said second receiving means is directed at said selected object.

3. In apparatus for selecting and locating an object in space, radiant energy directional transmitting means, first and second directional radiant energy receiving means separated by a predetermined distance, said first receiving means being connected to means synchronized therewith to continually designate the line of sight of a selected object reflecting said transmitted radiant energy, and means to direct said second receiving means at said selected object, said second receiving directing means including means to cause said second receiving means to scan along said line of sight of the selected object from the first receiving means.

4. In apparatus for selecting and locating an object in space, radiant energy directional transmitting means, first and second directional radiant energy receiving means separated by a predetermined distance, said transmitting means and first receiving means being located at the same point, said first receiving means being connected to means synchronized therewith to continually designate the line of sight of a selected object reflecting said transmitted radiant energy, and means to direct said second receiving means at said selected object, said directing means including means to cause said second receiving means to scan along said line of sight of the selected object from the first receiving means.

5. In apparatus for locating an object, radiant energy directional transmitting antenna means, first and second receiving means, said first receiving means comprising azimuth and elevation differentially rotating directional antenna means for scanning a field of space and rotating in synchronism with the transmitting antenna means, a normally inoperative cathode ray tube connected to the first receiving antenna means, said tube being adapted to project a beam upon receiving a radiant energy signal from an object scanned to produce a visual spot on the screen of said tube, azimuth and elevation potential varying means for deflecting the beam of the tube, said potential means varying in synchronism with the azimuth and elevation differentially rotating antenna means of the first receiving means, whereby the location of the spots on the screen of the tube are a measure of the azimuth and elevation of the objects in space from the first receiving means, said second receiving means consisting of azimuth and elevation directional antenna means, and a cathode ray tube, similar to the first mentioned tube, connected to the second receiving means, said second cathode ray tube having potential varying means varying in synchronism with that of the first tube whereby received signals from the same object, produce spots in the same position on the screens of both tubes.

6. In apparatus as recited in claim 5 in which means are provided to adjust the azimuth and elevation of said first receiving means so that the spot from a selected object appears at the center of the cathode ray tube connected to said first receiving means screen, whereby the appearance of a spot at the center of the screen of the second cathode ray tube indicates that the second receiving means is directed at this same object.

7. In apparatus as recited in claim 5 including means to adjust the azimuth and elevation of said first receiving means so that the spot from a selected object appears at the center of the screen of the cathode ray tube connected to said first receiving means, whereby the appearance of a spot at the center of the screen of the second cathode ray tube indicates that said second receiving means is also directed at said selected object, said azimuth and elevation adjustment of the first receiving means determining the line of sight of the selected object from said first receiving means; means to simultaneously provide equal adjustments in azimuth and elevation of said second receiving means to orient the second receiving means parallel to said line of sight of the selected object from the first receiving means, means to modify this orientation of said second receiving means by adding an arbitrary scanning motion in azimuth, and means to simultaneously modify the angle of elevation of this orientation of said second receiving means by an amount which is a function of the angles of azimuth and elevation of the selected object from said first receiving means and a function of the arbitrary angle of azimuth added to said orientation of said second receiving means, whereby said second receiving means is caused to scan along the line of sight of the selected object from the first receiving means.

8. In apparatus for locating an object, radiant energy directional transmitting antenna means, first and second receiving means, said first receiving means comprising azimuth and elevation differentially rotating directional antenna means for scanning a field of space and rotating in synchronism with said transmitting antenna means, visual means connected to said first receiving means to indicate the azimuth and elevation of a selected object from the first receiving means, said second receiving means comprising azimuth and elevation directional antenna means, visual means connected to the second receiving means and coordinated with said first visual means to indicate when both said first and second receiving means are directed at the same selected object, means to adjust the azimuth and elevation of the first receiving means in accordance with the line of sight of the selected object from the first receiving means, means to simultaneously provide equal adjustments in azimuth and elevations of said second receiving means to orient said second receiving means parallel to the line of sight of the selected object from the first receiving means, means to modify this orientation of the second receiving means by adding an arbitrary scanning motion in azimuth, and means to simultaneously modify the angle of elevation of this orientation of the second receiving means by an amount which is a function of the angles of azimuth and elevation of the selected object from the first receiving means and a function of the arbitrary angle of azimuth added to said orientation of the second receiving means, whereby the second receiving means is caused to scan along the line of sight of the selected object from the first receiving means.

9. In apparatus as recited in claim 4 and in which means are provided to indicate when said second receiving means is directed at said selected object.

10. In apparatus for selecting and locating an object in space, radiant energy directional transmitting means and first directional radiant energy receiving means located at the same point, a plurality of second directional radiant energy receiving means each separated from each other by a predetermined distance and located at predetermined distances from the first receiving means, said first receiving means being synchronized with the transmitting means to continually designate the line of sight of a selected object reflecting said transmitted radiant energy, and means at each of said plurality of second receiving means to direct each of said plurality of receiving means at said selected object, each of said directing means including means to cause each of said plurality of second receiving means to scan along said line of sight of the selected object from the first receiving means.

11. In apparatus as recited in claim 10 and in which means are provided at each of said plurality of second receiving means to indicate when each of said second receiving means is directed at said selected object.

ERIC R. BEHN.

REFERENCES CITED

The following references are of record in the file of this patent:

UNITED STATES PATENTS

| Number | Name | Date |
|---|---|---|
| 2,257,319 | Williams | Sept. 30, 1941 |
| 1,149,123 | Fuller | Aug. 3, 1915 |
| 1,468,018 | Gerhardt | Sept. 18, 1923 |
| 1,551,393 | Hewlett et al. | Aug. 25, 1925 |
| 2,116,717 | Schariau | May 10, 1938 |
| 2,216,716 | Withem | Oct. 1, 1940 |
| 2,297,534 | Brulin | Sept. 29, 1942 |